United States Patent [19]

Steinbaugh

[11] Patent Number: 4,533,965
[45] Date of Patent: Aug. 6, 1985

[54] MAGNETIC READ/WRITE CIRCUIT
[75] Inventor: Gary Steinbaugh, Villa Hills, Ky.
[73] Assignee: General Signal Corporation, Stamford, Conn.
[21] Appl. No.: 601,417
[22] Filed: Apr. 18, 1984
[51] Int. Cl.[3] ............................................. G11B 15/02
[52] U.S. Cl. ......................................... 360/62; 360/68
[58] Field of Search ........................ 360/62, 68, 61, 46

[56] References Cited

U.S. PATENT DOCUMENTS 3,182,298  5/1965  Lawrence ............................... 360/62
4,428,008  1/1984  Fawkes .................................. 360/61

FOREIGN PATENT DOCUMENTS 56-61008  5/1981  Japan ...................................... 360/62

Primary Examiner—Raymond F. Cardillo, Jr.
Assistant Examiner—Alyssa H. Bowler
Attorney, Agent, or Firm—Ronald Reichman

[57] ABSTRACT

This invention is an automatic read to write or write to read switching electronic recording and playback circuit that automatically disconnects the write section of the circuit when it is not in use, thus permitting reading without the necessity of an additional signal to select read or write.

9 Claims, 1 Drawing Figure

U.S. Patent    Aug. 6, 1985    4,533,965
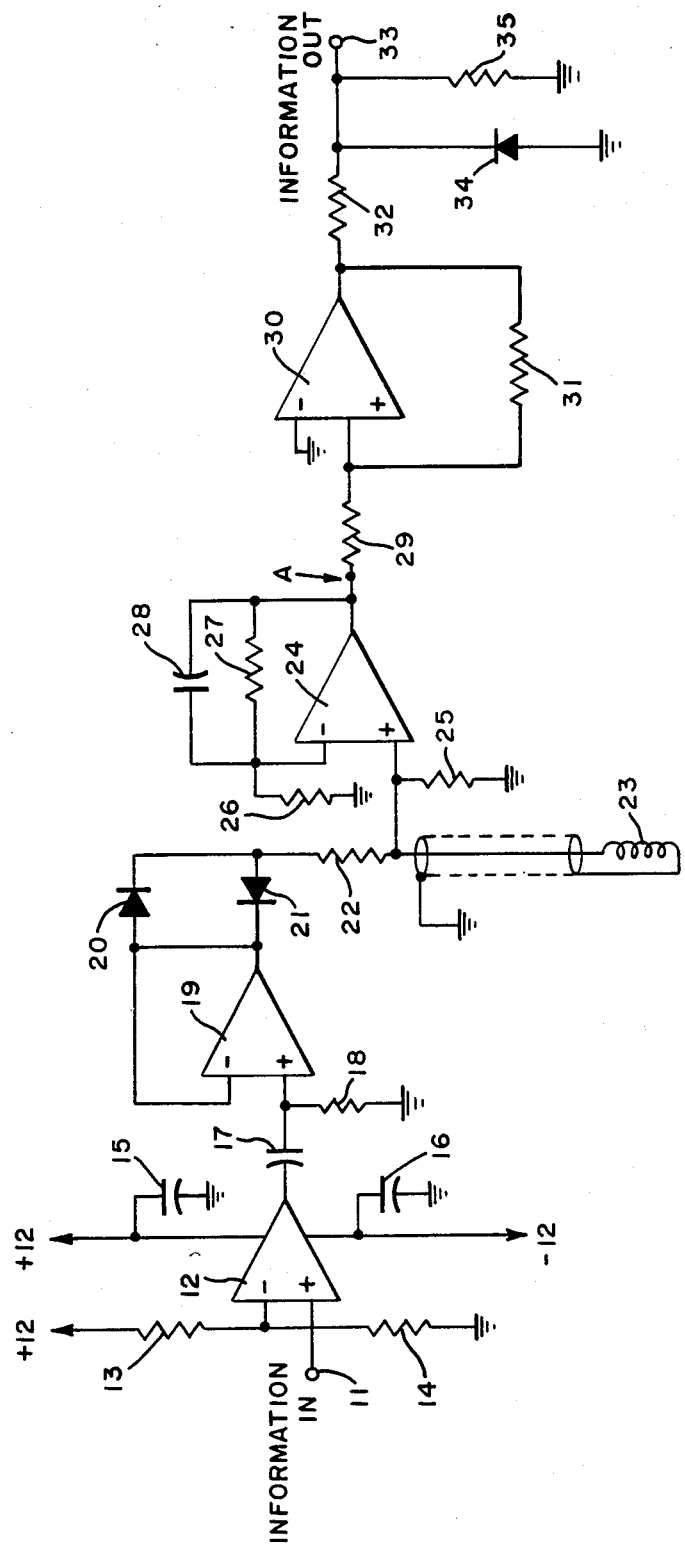

MAGNETIC READ/WRITE CIRCUIT

BACKGROUND OF THE INVENTION

1. Field of the Invention

This invention relates to electronic circuits, and more particularly to electronic circuits that record information on a magnetic material and read information that was recorded on a magnetic material.

2. Description of the Prior Art

Magnetic recording and playback equipment have been developed for the recording or writing of information on some magnetic medium, i.e., tape, disk, drum, etc., and reading or playing back the recorded information from the magnetic medium. The magnetic recording and playback equipment utilized an electromagnetic transducer and means for moving a ferromagnetic recording medium relative to the transducer for recording or writing electrical signals as magnetic variations in the medium. At a latter time, the magnetic recording/playback equipment would convert the information contained in the magnetic medium as magnetic variations back into electrical variations. Thus, the prior art system had to switch from a writing mode to a reading mode or a reading mode to a writing mode.

One of the disadvantages of the prior art was that the magnetic recording and playback equipment had to know if it wanted to be in a writing mode or a reading mode.

Another disadvantage of the prior art was that the magnetic recording and playback equipment had to receive a command or be manually switched from the write to read mode or read to write mode.

SUMMARY OF THE INVENTION

This invention overcomes the disadvantages of the prior art by providing a magnetic read/write circuit that is normally in the read mode unless it receives some information in which case it automatically switches to the write mode and switches back again to the read mode after the stream of information ceases. Thus, the apparatus of this invention senses the fact that information is to be recorded and automatically switches from the read mode to the write mode. Thus, the apparatus of this invention reduces cost, the amount of hardware used, and the number of signals utilized and software required to write and read information on or from a magnetic medium.

It is an object of this invention to provide a new and improved circuit for writing and reading information on magnetic media.

It is another object of this invention to shape the recorded analog signal and then convert the analog signal to a digital level.

Other objects and advantages of this invention will become more apparent as the following description proceeds, which description should be considered together with the accompanying drawing.

DESCRIPTION OF THE DRAWING

The only FIGURE in this case is a schematic representation of the apparatus of this invention.

DESCRIPTION OF THE PREFERRED EMBODIMENT

Referring now to the drawing in detail, the reference character 11 designates a terminal in which information enters the apparatus of this invention. Terminal 11 is coupled to the positive terminal of operational amplifier 12. One end of resistor 13 is coupled to +12 volts and the other end of resistor 13 is coupled to one of the ends of resistor 14. The other end of resistor 14 is coupled to ground. Resistor 13 may be a 5.1k resistor and resistor 14 may be a 1k resistor. (Throughout this description the volume of various components are only given for illustration purposes and are not intended to limit the scope of this invention). Resistors 13 and 14 are used to generate a reference voltage, which is coupled to the negative terminal of amplifier 12. A 0.1 uf by pass filter 15 is coupled to amplifier 12. One end of filter 15 is coupled to +12 volts and the other end of filter 15 is coupled to ground. A 0.1 uf by pass filter 16 is coupled to amplifier 12. One end of filter 16 is coupled to −12 volts and the other end of filter 16 is coupled to ground. Filters 15 and 16 are used to filter out any noise that may be on the line.

The foregoing circuitry performs a conversion type function, i.e., it converts a TTL level information input into analog levels. The analog levels are between +12 and −12 volts. Resistors 13 and 14 will generate a reference voltage around 2 volts. Hence, any reading below 2 volts will produce a −12 volt output from amplifier 12 and any reading above 2 volts will produce a +12 volt output from amplifier 12.

The output of amplifier 12 is coupled to one of the ends of 0.1 uf capacitor 17. The other end of capacitor 17 is coupled to 100k resistor 18 (the other end of which is also connected to ground) and the positive input of amplifier 19. The output of amplifier 19 is coupled to the negative input of amplifier 19, the cathode of diode 21, and the anode of diode 20. The anode of diode 21 is also coupled to the cathode of diode 20 and to one end of a 510 ohm resistor 22. The other end of resistor 22 is connected to magnetic head 23. Magnetic head 23 is also connected to ground.

Capacitor 17 acts as a high pass filter to insure that no low frequency signals will be recieved by amplifier 19. Hence, if no signal is present on the positive input to amplifier 19, amplifier 19 will be disconnected from the output of amplifier 12 and amplifier 19 will see zero (0) voltage as its positive input. Amplifier 19 will act as a voltage follower and its output voltage will be the same as its input voltage. Amplifier 19 will be amplified in current not in voltage. Diodes 20 and 21 will not conduct until there is approximately 0.7 volts across them. Hence, if the output of amplifier 19 is not greater than +0.7 volts, diodes 20 and 21 will disconnect amplifier 19 from resistor 22. In the event amplifier 19 has a output signal greater than ±0.7 volts, this signal will pass through diodes 20 and 21. Thus, amplifier 19 and diodes 20 and 21 will act as a automatic switch. When data is present at terminal 11, the output of amplifier 19 and diodes 20 and 21 is approximately ±11 volts, which is applied to current limiting resistor 22. The current that passes through resistor 22 will cause magnetic head 23 to generate a magentic field causing information to be recorded or written on some magnetic medium, i.e., tape, disk, drum, etc. (not shown). When the output of amplifier 19 is less than ±0.7 volts, magnetic head 23 will do nothing. The foregoing has described a portion of a circuit that automatically disconnects magnetic head 23 when it is not in use, permitting this circuit to read without using an additional signal to select read or write.

Magnetic head 23 is connected to the positive terminal of amplifier 24, and one of the ends 10k magnetic head load resistor 25. The other end of resistor 25 is connected to ground. One of the ends of 1k resistor 26 is connected to ground and the other end of resistor 26 is connected to the negative input of amplifier 24, one of the ends of 100k resistor 27 and one of the ends of 100 pf capacitor 28. The other ends of resistor 27 and capacitor 28 are coupled to the output of amplifier 24, which is connected to one of the ends of 1k resistor 29. The other end of resistor 29 is coupled to the positive terminal of amplifier 30 and one of the ends of 27k resistor 31. The negative terminal of amplifier 30 is coupled to ground. The other end of resistor 31 is coupled to the output of amplifier 30 and one of the ends of 2k resistor 32. The other end of resistor 32 is coupled to the information out terminal 33, one of the ends of diode 34 and one of the ends of resistor 35. The other ends of diode 34 and resistor 35 are coupled to ground.

When the apparatus of this invention is reading, the output of head 23 will be passed through amplifier 24. The output of amplifier 24 will be a replica of its input signal, hence a test circuit may be connected to point A to insure that the writing circuit is working.

When the apparatus of this invention is reading, the magnetic medium, i.e., tape, disk, drum, etc. (not shown) will pass magnetic head 23, thereby inducing a voltage in head 23. This voltage will be applied to the positive terminal of negative feedback amplifier 24. Amplifier 24 amplifies the signal that is received from head 23 by 100

$$\left( \frac{\text{Resistance of Resistor 27}}{\text{Resistance of Resistor 26}} = \frac{100k}{1k} = 100 \right)$$

and capacitor 28 reduces any high frequency noise that may be present in the circuit. The output of amplifier 24 is connected to the negative input of amplifier 24 to increase the stability of amplifier 24. The output of amplifier 24 is a series of positive or negative convex pulses.

Amplifier 30 is used to shape the output of amplifier 24 into a square wave. The output of amplifier 30 will be either +12 volts or −12 volts. Amplifier 30 will act like a comparator with hysteresis. Resistors 31 and 32 will determine the magnitude of the output signal of amplifier 24 that is required to switch from +12 volts to −12 volts or −12 volts to +12 volts.

The output of amplifier 30 will remain in the positive or negative state until the input of amplifier 30 is of a specific magnitude to cause the output of amplifier 30 to switch states. The negative terminal of amplifier 30 is grounded to supply a reference voltage and insure that amplifier 30 will produce a positive pulse of so many volts above or below ground, and resistors 35 and 32 are used to convert the digital signals back to TTL levels. Diode 34 is used to insure that the most negative voltage leaving amplifier 30 is −0.7 volts.

Thus, the comparator portion of this circuit shapes the output of amplifier 24 at analog levels before the signal is converted to TTL levels.

The above specification has described a new and improved circuit for recording and reading information from a magnetic material. It is realized that the above description may indicate to those skilled in the art additional ways in which the principles of this invention may be used without departing from its spirit. It is, therefore, intended that this invention be limited only by the scope of the appended claims.

What is claimed is:

1. An automatic read to write or write to read switching electronic recording and playback circuit for recording and playing back digital information, said circuit comprises:
   (a) a high press filter for preventing the passage of low frequency signals; the input of said filter is coupled to said information;
   (b) a first amplifier that reproduces its input signal, the positive input of said amplifier is coupled to the output of said high pass filter;
   (c) a first diode whose anode is coupled to the output of said first amplifier;
   (d) a second diode whose cathode is coupled to the anode of said first diode and to the output of said first amplifier and whose anode is coupled to the cathode of said first diode so that said first amplifier and said first and second diodes will act like an automatic switch;
   (e) means for recording or reading information on a magnetic material, said means writes information when said means receives signals from said second diode and said means is completely disconnected from said second diode when it is not receiving signals;
   (f) a second amplifier whose input is coupled to said means for recording or reading information on a magnetic material, and whose output is coupled to the negative input of said second amplifier; and
   (g) a third amplifier whose positive input is coupled to the output of said second amplifier; said third amplifier shapes its input signals into a series of square waves.

2. The circuit claimed in claim 1 wherein said means is a magnetic head.

3. The circuit claimed in claim 1 further including a detector coupled to the output of said second amplifier, said detector checks the information that is being recorded by said means.

4. The circuit claimed in claim 1 wherein said third amplifier is a comparator.

5. An automatic read to write or write to read switching electronic recording and playback circuit for recording and playing back information, said circuit comprises:
   (a) conversion means coupled to said information for making said information input signals into analog levels which are compatible with the rest of this circuit;
   (b) a high pass filter for preventing the passage of low frequency signals; the input of said filter is coupled to the output of said conversion means;
   (c) a first amplifier that reproduces its input signal, the positive input of said amplifier is coupled to the output of said high pass filter;
   (d) a first diode whose anode is coupled to the output of said first amplifier;
   (e) a second diode whose cathode is coupled to the anode of said first diode and to the output of said first amplifier, and whose anode is coupled to the cathode of said first diode so that said first amplifier and said first and second diodes will act like an automatic switch;
   (f) means for recording or reading information on a magnetic material, said recording means writes information when said recording means receives signals from said second diode and said recording means is completely disconnected from said second diode when it is not receiving signals;

(g) a second amplifier whose input is coupled to said means for recording or reading information on a magnetic material, and whose output is coupled to the negative input of said second amplifier; and (h) a third amplifier whose positive input is coupled to the output of said second amplifier; said third amplifier shapes its input signals into a series of square waves.

6. The circuit claimed in claim 5 wherein said recording means is a magnetic head.

7. The circuit claimed in claim 5 further including a detector coupled to the output of said second amplifier, said detector checks the information that is being recorded by said means.

8. The circuit claimed in claim 5 wherein said shaping means is a fourth amplifier.

9. The circuit claimed in claim 5 wherein said third amplifier is a comparator.

* * * * *